US010803064B1

(12) United States Patent
Sanders et al.

(10) Patent No.: US 10,803,064 B1
(45) Date of Patent: Oct. 13, 2020

(54) SYSTEM AND METHOD FOR DYNAMIC SCALING AND MODIFICATION OF A RULE-BASED MATCHING AND PRIORITIZATION ENGINE

(71) Applicant: Wells Fargo Bank, N.A., San Francisco, CA (US)

(72) Inventors: Adam Sanders, Huntersville, NC (US); Christopher Shain, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 302 days.

(21) Appl. No.: 15/458,252

(22) Filed: Mar. 14, 2017

(51) Int. Cl.
*G06F 16/2455* (2019.01)
*G06F 16/2458* (2019.01)
*G06F 16/2457* (2019.01)

(52) U.S. Cl.
CPC .... *G06F 16/24564* (2019.01); *G06F 16/2468* (2019.01); *G06F 16/24578* (2019.01)

(58) Field of Classification Search
CPC .......................................................... G06F 17/30
USPC ............................................................. 705/26
See application file for complete search history.

(56) References Cited

U.S. PATENT DOCUMENTS

| 6,453,347 | B1 | 9/2002 | Revashetti et al. |
| 7,756,827 | B1 | 7/2010 | Yung et al. |
| 8,001,525 | B2 | 8/2011 | Agostini et al. |
| 8,103,534 | B2 | 1/2012 | Kruk et al. |
| 8,255,270 | B2 | 8/2012 | Rose et al. |
| 8,352,306 | B2 | 1/2013 | Rose et al. |
| 8,600,795 | B2 | 12/2013 | Birr |
| 8,775,231 | B1 | 7/2014 | Nipko et al. |
| 9,037,589 | B2 * | 5/2015 | Anderson ........... G06F 16/3338 707/737 |
| 9,202,200 | B2 | 12/2015 | Stibel et al. |
| 9,323,767 | B2 | 4/2016 | Blanchflower et al. |
| 9,324,109 | B1 * | 4/2016 | Joseph ................... G06Q 30/08 |
| 9,594,743 | B2 | 3/2017 | Bunin et al. |
| 10,146,853 | B2 * | 12/2018 | Krauss .................. G06F 16/367 |
| 10,475,093 | B2 * | 11/2019 | Sher ....................... G06Q 40/00 |
| 10,484,501 | B2 * | 11/2019 | Faltyn ............... H04M 1/72563 |
| 10,489,758 | B2 * | 11/2019 | Jain ......................... G06Q 20/10 |
| 10,489,797 | B2 * | 11/2019 | Noyes .................... G06Q 30/08 |
| 10,496,604 | B2 * | 12/2019 | Boss ...................... G06F 16/335 |
| 10,498,638 | B2 * | 12/2019 | Jackson .................. H04L 69/22 |

(Continued)

OTHER PUBLICATIONS

"Business Opportunities: Big Data", (Jul. 2013), 25 pgs.

(Continued)

*Primary Examiner* — Kim T Nguyen
(74) *Attorney, Agent, or Firm* — Schwegman Lundberg & Woessner, P.A.

(57) ABSTRACT

A system and related method are provided for dynamically modifying a rule-based matching system. The method comprises using a processor for receiving a plurality of rules that are stored in a matching metadata database in a storage device, and receiving a plurality of entities as inputs. The method further comprises determining a degree of matching between a first entity and a second entity of the plurality of entities, using at least two of the plurality of rules that contribute to the degree of matching. The method then outputs the determined degree of matching to a display device, and dynamically modifies, at run-time, at least one of the plurality of rules.

20 Claims, 6 Drawing Sheets

(56) References Cited

U.S. PATENT DOCUMENTS

| | | |
|---|---|---|
| 2003/0023531 A1 | 1/2003 | Fergusson |
| 2003/0023593 A1 | 1/2003 | Schmidt |
| 2004/0143508 A1 | 7/2004 | Bohn et al. |
| 2009/0037356 A1 | 2/2009 | Rothstein et al. |
| 2009/0327040 A1 | 12/2009 | McInerny |
| 2010/0063890 A1 | 3/2010 | Huckleby |
| 2010/0131339 A1 | 5/2010 | Singh |
| 2011/0246255 A1 | 10/2011 | Gilbert et al. |
| 2011/0295854 A1 | 12/2011 | Chiticariu et al. |
| 2012/0136812 A1 | 5/2012 | Brdiczka |
| 2013/0096992 A1 | 4/2013 | Sugimoto et al. |
| 2013/0124626 A1 | 5/2013 | Cathcart et al. |
| 2013/0185086 A1 | 7/2013 | Bank et al. |
| 2014/0278799 A1 | 9/2014 | McLean |
| 2014/0310290 A1 | 10/2014 | Huang et al. |
| 2015/0112755 A1 | 4/2015 | Potdar et al. |
| 2016/0071134 A1 | 3/2016 | Duncan |
| 2016/0232222 A1 | 8/2016 | McCloskey et al. |
| 2017/0053357 A1 | 2/2017 | Bowman et al. |
| 2018/0232730 A1 | 8/2018 | Harbour et al. |

OTHER PUBLICATIONS

U.S. Appl. No. 15/710,150, filed Sep. 20, 2017, Machine Learning Integration for a Dynamically Scaling Matching and Prioritization Engine.

U.S. Appl. No. 16/143,834, filed Sep. 27, 2018, Optimizing Database Query Processes With Supervised Independent Autonomy Through a Dynamically Scaling Matching and Priority Engine.

"U.S. Appl. No. 15/710,150, Non Final Office Action dated Jul. 17, 2019", 14 pgs.

"U.S. Appl. No. 16/143,834, Non Final Office Action dated Apr. 29, 2020", 18 pgs.

* cited by examiner

| | RULE (PRE) | 50 |
|---|---|---|
| | RULE (POST) | 55 |

| | CREATE | UPDATE | DELETE |
|---|---|---|---|
| ENTITY | | | |
| RULE | | | |
| MATCH | | | |

| RULE 1 | 50 |
|---|---|
| RULE 5 | 25 |
| RULE 8 | 75 |
| RESULT | 9.4 |

SYSTEM AND METHOD FOR DYNAMIC SCALING AND MODIFICATION OF A RULE-BASED MATCHING AND PRIORITIZATION ENGINE

TECHNICAL FIELD

Described herein is a computer-based system, and more particularly, but without limitation to a system and method for dynamic scaling and modification of a rule-based matching & prioritization engine.

BACKGROUND

Typical computer matching engines rely upon predefined rules in order to determine whether two elements match. These engines further generally rely upon a substantial degree of similarity between elements in order to trigger a match. The elements that are matched need to be formed in a rigid manner so that a parsing engine can easily determine respective components of the element. Such systems, however, are not suited when the input is provided in a less-than structured form, and when rules that go into forming the matches are dynamically changing.

SUMMARY

Disclosed herein is a computer-implemented method for dynamically modifying a rule-based matching system. The method comprises using a processor for receiving a plurality of rules that are stored in a matching metadata database in a storage device, and receiving a plurality of entities as inputs. The method further comprises determining a degree of matching between a first entity and a second entity of the plurality of entities, using at least two of the plurality of rules that contribute to the degree of matching. The method then outputs the determined degree of matching to a display device, and dynamically modifies, at run-time, at least one of the plurality of rules.

Disclosed herein is also a system with a hardware processor, a storage device connected to the hardware processor comprising a matching metadata database having a plurality of rules. The system further has a database with a plurality of entities received at an input of the system, and a match database with a plurality of matches and respective match values between two entities of the plurality of entities determined by the processor using at least two rules of the plurality of rules. At least one of the plurality of rules is dynamically modifiable at run-time.

Disclosed herein is also a non-transitory computer-readable storage medium, the computer-readable storage medium including instructions that when executed by a processor, cause the processor to execute the method described above.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Systems for which inputs are not rigidly structured have relied extensively on human input to assist more basic computational determinations of good matches. A system and method for matching entities and rating such matches may benefit from use of a flexible system in which inputs are not rigidly structured, rules can be dynamically changed, and the system can be dynamically expanded in terms of computer resources based on those needed when executing the matching. A use case that is described below is a matching system for assisting customers of a financial securities service provider to find financial products that they are interested in. However, the systems and methods described herein are not limited in this regard, and may be used in any process that identifies trends between disparate data sets. A real-time calculation engine may be applied to any number of data sets and have business rules for identifying matched targets injected at runtime. In one implementation, the system may leverage enhanced software and algorithms built on top of a vendor supplied grid computing solution, such as Oracle Coherence.

Prior matching systems used in this field would historically have a sales team monitoring internal trading desk activities, which would include things such as offerings and request for quotes (RFQs). These would be stored in a database, and a sales team would rely on matching algorithms that looked at specific inquiries and offerings to determine if a good match was available. The sales team members could utilize their own human intuition to determine a potential for a good match, but such efforts are labor intensive, not necessarily cost effective, and may miss potential matches. This manual process relied heavily on the skill of the sales force and efficiency varied accordingly. Several systems have been utilized over the years to address this, but these systems relied on rigidly programmed algorithms and therefore offered limited benefit.

By way of example, one such system matched buyers and sellers based on an identifier, the Committee on Uniform Securities Identification Procedures (CUSIP), of the security. This solution works acceptably when there is an exact match on the security (e.g., a buyer for an IBM ten-year bond for and a seller for an IBM ten-year bond). However, this system does not work well when one or both ends of the match are not precisely defined or do not perfectly match. For example, if there is a seller for the IBM ten-year bond, but the buyer has only indicated an interest in a "mid-term blue-chip tech instrument", the system might not be able to easily determine that this may, in fact, be a good match.

Thus, an aspect of the present system is that it may allow for dynamically defined rules that are capable of "fuzzy-matching", based on loosely defined terms. It may further automatically determine a priority based on a weight of that match. Thus, in the systems described herein, an exact match as previously described still works perfectly, but the system may also pick-up a more generally defined request and perform a more accurate assessment of matching—the combination of a dynamically scaled distributed computing grid coupled with a scored weighting of ingested data and rules allows for a novel implementation.

Although the system described herein relates to a system and method for dynamic scaling and modification of a rule-based matching & prioritization engine, this system, in an implementation, may further comprise an interface to a system that actually executes matching trades.

Figure 1A:
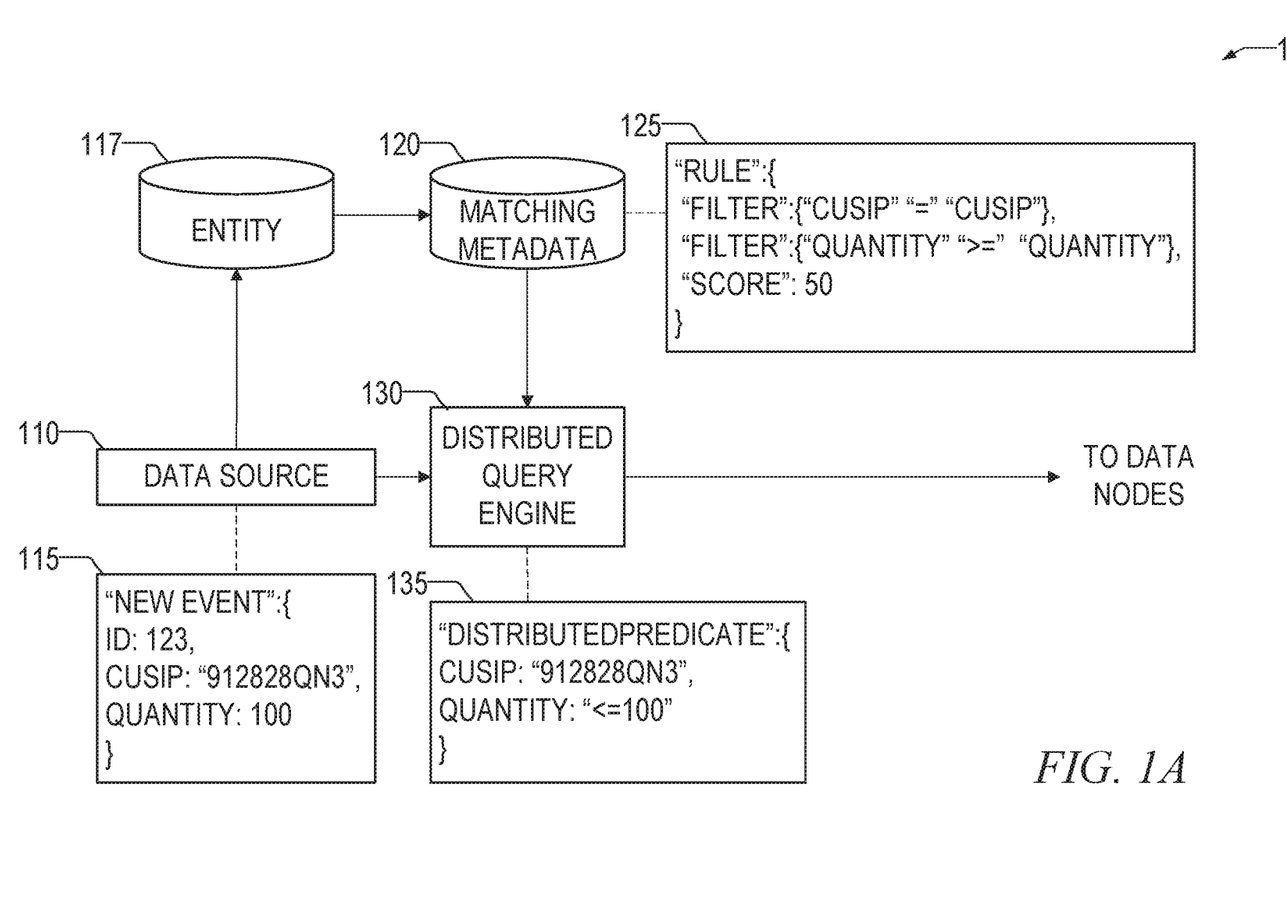
FIGS. 1A and 1B are parts of a block diagram illustrating an example of a matching system as described herein.
Figure 1B:
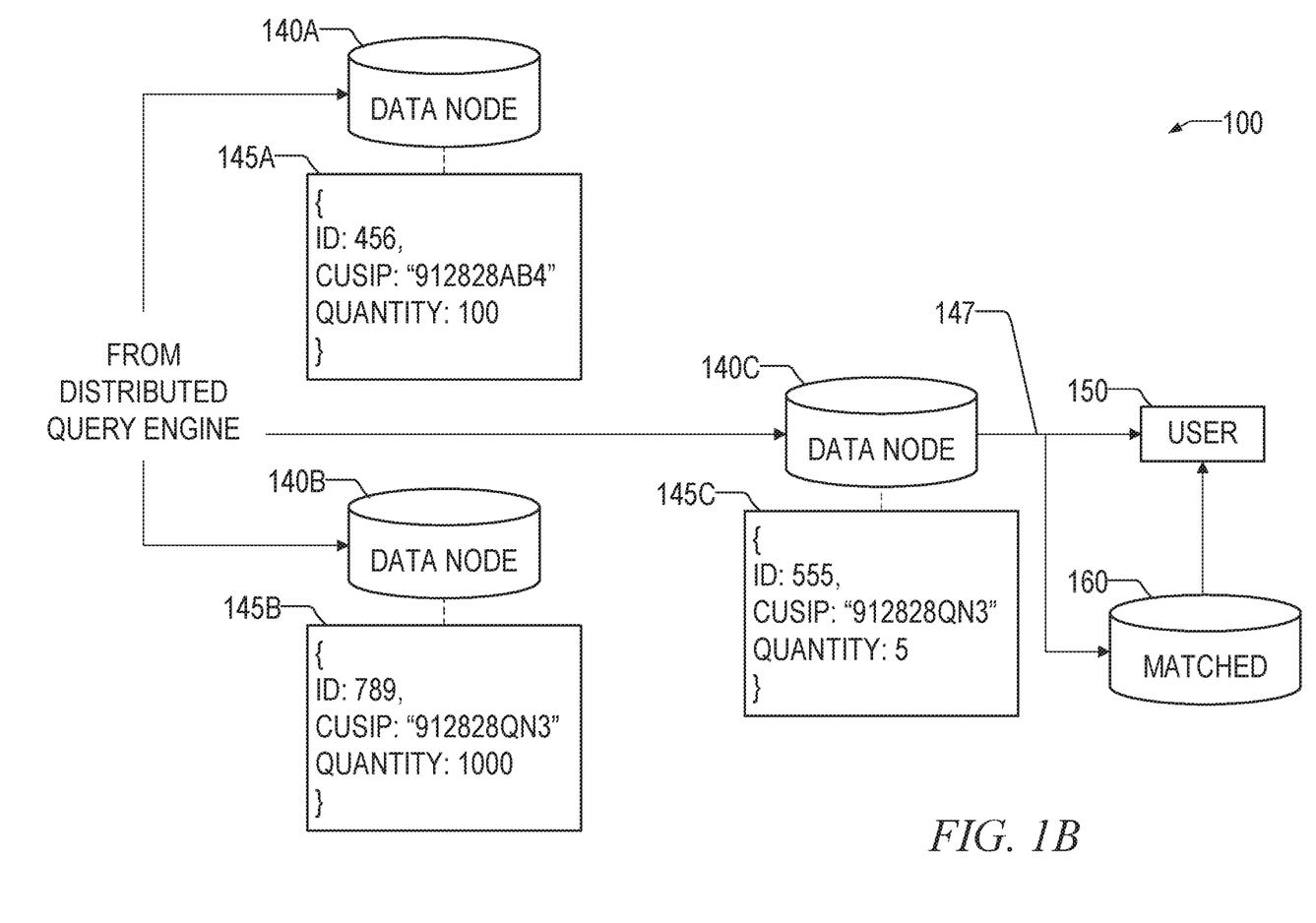

FIGS. 1A and 1B are parts of a block diagram illustrating an example of this system 100. In FIG. 1A, the system 100 allows a wide variety of data sources 110 to serve as inputs. A wide variety of inputs from various data sources 110 may be ingested by the system, and the system may be designed to scale based on a varying quantity of inputs from multiple data sources.

Some potential data sources 110 for the example systems described herein may include a first source of information from external data vendors, which includes things like holding information and public filings information that may be purchased from a data vendor. Such databases may be received periodically and then may be fed into the system. In that case, each record may be either a new record or an update of an existing record, and the event may be considered at the point in time that the database is imported. One second source of information may be internal systems and records, such as internal trading and sales systems that provide information as trades occur. One third source of information may be direct interaction with an end user, such as a person interacting with the system and entering data into the system using an input device (e.g., a keyboard). There may be further sources of information as well, such as publicly available news, social, and data services from which relevant information may be obtained.

An example event 115 from a data source 110 is illustrated in FIG. 1A. The event 115, designated "New Event" may comprise an identifier "123", a CUSIP of the security "912828QN3", and a quantity of 100 (shares). The event may be stored in an entity database 117 that is used to keep entities against which other entities are matched.

Although the event 115 may contain an attribute indicating an interest in a "buy" or a "sell" for the matching, in some scenarios, a client may not specifically be interested in a buy or a sell specifically, and may simply be learning about a particular asset, such as a mutual fund. By way of example, the user may be interested in hearing about business being done with respect to IBM or ten year treasuries without a specific buy or sell in mind. In that scenario, the user's interest may be recorded, and this interest may show up as a match for more generally constructed rules. In other scenarios, it may be known that the user is a holder of a given bond, and that user may be looking to expand their position or they may be looking to sell off that position. The fact that that the user is a holder of the given bond may constitute an input record without necessarily having a buy or sell indicator. But where a buy or sell interest is known, it could be included in the database as well.

A matching metadata database 120 contains rules 125 that relate to entities such as the events 115 received from the data source 110. Rules 125 clauses (filters) may be flexible and extensible. They may be as simple or as complex as needed, and may include fuzzy matching or machine learning/artificial intelligence (AI) implementations. Multiple rules may be executed in parallel to produce matches based on different criteria. According to the rule 125 illustrated, two filters are utilized in order to contribute to a score of a match. The first example filter indicates that the CUSIPs of the entities must be equal in order for the rule to apply. The second filter indicates that the quantity of one entity is greater than or equal to the quantity of another entity. If this is true, then, for example, a match score of 50 may apply to the match. In the example, the score has a base of 100, so the match score of 50 may mean to modify an existing match score (from other rules, possibly) by 0.5.

In one implementation, the rules 125 may have clauses that are scored. In this implementation, the rule 125 as a whole either matches or it does not, although in other implementations, a degree of matching may be utilized. When the rule 125 matches, the score of that rule may be applied to an overall result of other rules 125 for a match, and all of the results of a plurality of rules 125 (at least two) may be combined in some manner (a sum, a product, a highest value of a matching rule, etc.). The matching rule should produce a non-zero rule score for the match.

Figure 2:
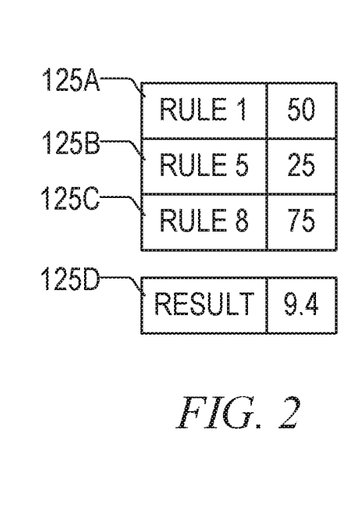
FIG. 2 is a block diagram that illustrates an implementation of combining applicable rules to produce a result.

FIG. 2 is a block diagram that illustrates an implementation of combining applicable rules to produce a result. After going through the matching metadata (rules) database 120, three rules (Rule 1 125A, Rule 5 125B, and Rule 8 125C) are found to produce a matching score between two entities. Scoring these rules as a percentage match, and taking a product of the rules, a result 125D of applying the rules indicates a 9.4% match between the two entities. Any form of normalization may be applied to produce relevant results.

A very generic rule may be applied that shows some form of a match, but is not very specific-thus, such a rule might have a low score. In contrast, a very specific rule (such as one requiring identity of security as well as exactly equal quantities) might have a much higher score. Thus, in one implementation, a rule score may be proportional to a degree of specificity. But the solution described herein is not limited to this. Different types of rules may be utilized that might match in a different way. For example, a rule might provide that if two entities match at a 50% level, then a smaller score will be applied than if they match at a 75% level. Furthermore, the scores do not have to be linear, but could be exponential or follow some other form of mathematical relationship. The resulting score on the match may be a flexible function of the rule that was used to produce that match. The rule and its related score can be manually assigned, calculated, or based on a derived answer, and any functions may be applied. It can be a very flexible value. In the above example, instead of just applying a value of 50 for a greater than or equal to value, one could create a formulaic score that is lower the further apart the values are.

A distributed query engine 130 may be used to perform a predicate evaluation that may be performed in parallel across all data nodes 140A, B, C discussed in more detail below (reference numbers herein having letter designations after them may be referred to collectively or representatively by the reference number alone—for example, 140A, B, and C may be referenced by 140). Based on the new event 115 received, a distributedPredicate 135 may be created and evaluated across the data nodes 140.

Referring to FIG. 1B, there are three data nodes 140A, B, C containing potential matching elements to the distributedPredicate 135 taken in conjunction with the rule 125. A data node 140 may store large numbers of documents that may be subject to analysis for matching. Field-level indexing may be utilized within the node to optimize the evaluation process. The first data node 140A contains a first record 145A to consider matching against the rule 125. However, this record does not meet the first filter condition, that is, the CUSIPs do not match. The second data node 140B contains a second record 145B to consider matching against the rule 125. This record does not meet the second filter condition, that is, the quantity is too high. The third data node 140C contains a third record 145C to consider matching against the rule 125, and this match 147 is presented to the user 150. This record meets both of the filter conditions/requirements it has the same CUSIP as required by the first filter, and the quantity is within the second filter. Therefore, the score of this record 145C as matched against the distributedPredicate 135 is 50. This scoring may be done to distinguish high-value matches from low-value matches, and, in one implementation, the matching results may be reported in real-time to a client 150 or end-user. The filters may be designed so that they are all or nothing, that is, if the condition of the filter is not met, the rule is not met. However, it is also possible to design the filter to contain an equation that adjusts a rule score. For example, the rule score could be proportionate to how closely a quantity value matches between two entities.

The rules 125 may be flexible and configurable to accommodate a wide variety of situations, and may be changed in real-time, during operation of the system. By way of the example above regarding the IBM ten-year bond, a "blue-chip tech" term could be interpreted to mean a particular set of companies (and the different companies could be scored differently). However, if a company fell out of grace, this term could be removed from being interpreted as a "blue-chip tech", or else replaced with a lower scoring value. This could be done in real time, during operation of the system and in between searches, so that the matches made in one minute could differ from those made in the next if the underlying rule changed during that period of time. The rules 125 that govern the matches between data elements may be completely fluid and can be defined at runtime by users or by techniques such as machine learning. The rules 125 for determining matched results and the relative worth/score of those results may be distributed across all nodes 140 in the system.

In addition to rules 125 that directly relate to the matches, other types of rules may be present in the system 100. For example, meta-rules may be defined that guide how the system operates. These meta-rules may relate to the rules 125, as opposed to event matching. This may allow consistency of operation as a part of the infrastructure. For example, in an implementation, the following meta-rules might be employed. When a rule is deleted, matches resulting from that rule are retained. When a new rule is added, the system does not try to evaluate every possible match that could have resulted from that rule. When a rule is modified, the system goes back and updates any existing matches resulting from that rule. For example, a match may be disqualified or a score may be raised and lowered. The meta-rules (or any rules) may be application-specific, customizable, and may be different for different applications of the technology.

In an implementation, the system is event driven in that various types of events may initiate sequences, and the rules in the system may be triggered off of a variety of different events. The variety of different events may cause lifecycle processes to kick off in the system that may then update the entire distributed system.

Figure 3:
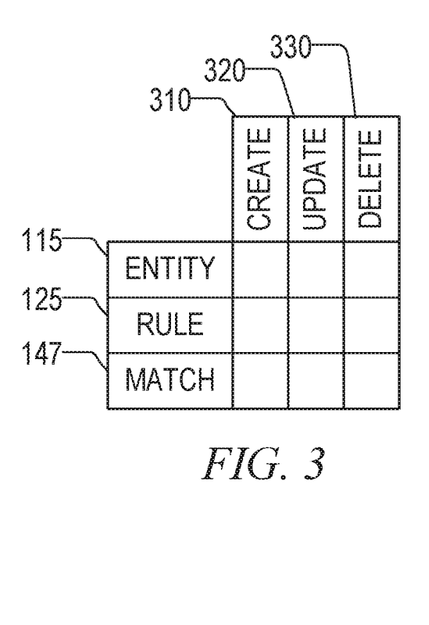
FIG. 3 is a block diagram that illustrates a breakdown of an implementation of the system features.

FIG. 3 is a block diagram that illustrates a breakdown of an implementation of the system features. The system may comprise three elemental pieces: entities 115, rules 125, and matches 147. For each of these elemental pieces, there may be create 310, update 320, and delete 330 operations. Using these three operations on the three elemental pieces, in an implementation, can provide complex system functionality. A new entity might be entered into the system that may trigger one or more rules to execute, which, in turn, may create one or more matches. An entity might be updated which can trigger some rules to update their resulting actions. Some matches may be created, some matches may be deleted, and some matches may be changed in response to an entity update. Or if an entity is deleted, the result might be a number of matches being removed.

In this manner, through a combination of configurable and self-evolving algorithms, the system may identify matches that may create opportunities for those processing the data. In a sales context, the system may present these opportunities to a sales team as a highly optimized and configurable queue of opportunities. The system may dynamically model the data and match it with other dynamically ingested data. The computing grid may also automatically scale to handle a varying number of entities being processed and/or increased algorithmic complexity (that is, a varying in complexity of the rules).

The distributed data nodes 140 may be added at runtime. Each node 140 may operate as a combination ingestion/storage/calculation engine, and may ingest data according to the data configuration rules 125 that may be defined at runtime. The data itself may be dynamically added from any source format.

The software may self-organize the data and processing to ensure dynamic scalability regardless of the number of nodes that are added to the cluster, the amount of data housed, or the complexity of the evolved algorithms. Matched results may be stored in a matched data element/store or match database 160 that may be reflected to non-computing mirrors that route the results to a high-efficiency display system. Users 150 may leverage the system 100 to observe and interact with the underlying data, algorithms, and relative scores of matches among data-points or entities. The users may provide input based on the matching results and the system may intelligently update the underlying algorithms to include this input in the calculations. For example, the user may indicate that a particular system-generated match is not appropriate, and this "breaking" event may be used to lower the system-calculated score for future matches of the same type (more detail given below).

In one implementation, distributed computing may be used to scale processing power generally linearly with the number of compute and/or ingestion nodes (distributed query engines 130) added. The system 100 may be designed to allow for ingestion of any data with limited restrictions on the format or source. The system 100 may also dynamically modify the rules at run-time, during operation of the system and between matches, by optimizing the matching algorithms based on the content of data that is currently being ingested and the type and extent of the analysis being performed. Thus, the processing power may be expanded based on only on a volume of input data to be ingested, but also based on a computational demand created by the complexity of the rules. Thus, the scaling may be based off of predictive branching. The system may determine that because a particular rule is invoked and creates a partial match, it determines that a further analysis needs to be done, and that this further analysis need to invoke available computational power in the grid. And the system may be able to eliminate branches of computation to scale more efficiently and effectively. This design allows for even better scalability and performance because the system may rely on predictive branching to optimize the dataset being evaluated. For example, the system may determine that a particular matching rule is comprised of an "expensive" calculation and a simpler "cheap" calculation. Rather than evaluating these calculations in arbitrary order, the system may choose to evaluate the cheaper calculation first to potentially rule out matches without having to execute the expensive calculation.

When the system 100 is utilized to operate on financial information in a capital markets space, it may be capable of providing high-quality targets for sales with accuracy and speed. This system 100 may be integrated with systems for Indications of Interest, Requests for Quotes, Offerings, and Static Product Data, to name a few in this space, and may be capable of evaluating matches using real-time market information, such as price or credit rating. The system 100 may also calculate relative information on the underlying data such as time-to-maturity for bonds and integrate that into the weighting.

Users may interact with this real-time system 100 model to optimize matches and further enhance the usefulness of the system and algorithms. The system's design allows improvements to identifying and matching counterparties for interactions/transactions based on loosely defined information. Users may also enrich data with additional information that was not included in the original ingestion in real-time. Because of the dynamic nature of the system, this additional information may automatically be included in the calculations and matches.

Figure 4:
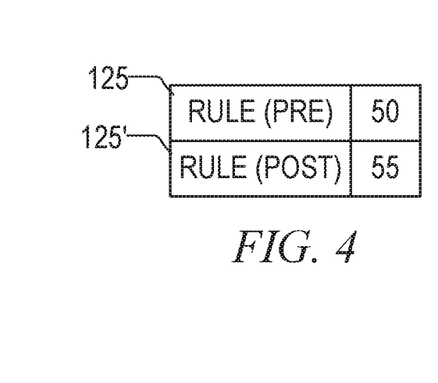
FIG. 4 is a block diagram that illustrates one implementation in which, when a match made by the system the rule is updated based on whether the match is a good one or not.

This may be accomplished, for example, by providing feedback into the system. FIG. 4 is a block diagram that illustrates one implementation in which, when a match made by the system the rule is updated based on whether the match is a good one or not. Such matches may be marked by a person as good or bad, and the system can integrate the feedback into the rules to assist it in applying those rules in the future. In FIG. 4, an initial (pre) rule is applied to a certain match and produced a result of 50. This match could be, for example, a matching of a "ten-year security" with a "mid-term security." A user reviewing the match recognized it as a good match and provided an indicator to the system that this was a good match. In response, the system could update the rule to produce a (post) rule 125' that gives such a match a result of 55 in the future. In another implementation, the system can receive automated feedback as to whether a particular exchange took place or not (e.g., the user who was looking to buy "a mid-term security" executed on a ten-year security). An actual exchange, closed deal, or closed trade may be a good indicator of a good match.

When changes are made in the system (either user, input data, or computer/AI-based), in one implementation, historical records may be kept of the changes that are made. This may permit a possible rollback to a particular point if problems develop. A delete, for example, may simply be a store with an older version number-so that it may be recalled later, if necessary. This may hold true, in an implementation, for matches. If two entities become matched as a result of a rule running, and then later on one of those entities is removed, the match may be removed as well (since one of those things that it points to is no longer in the system). But the match in the entity remove may still be archived for historical purposes.

Figure 5:
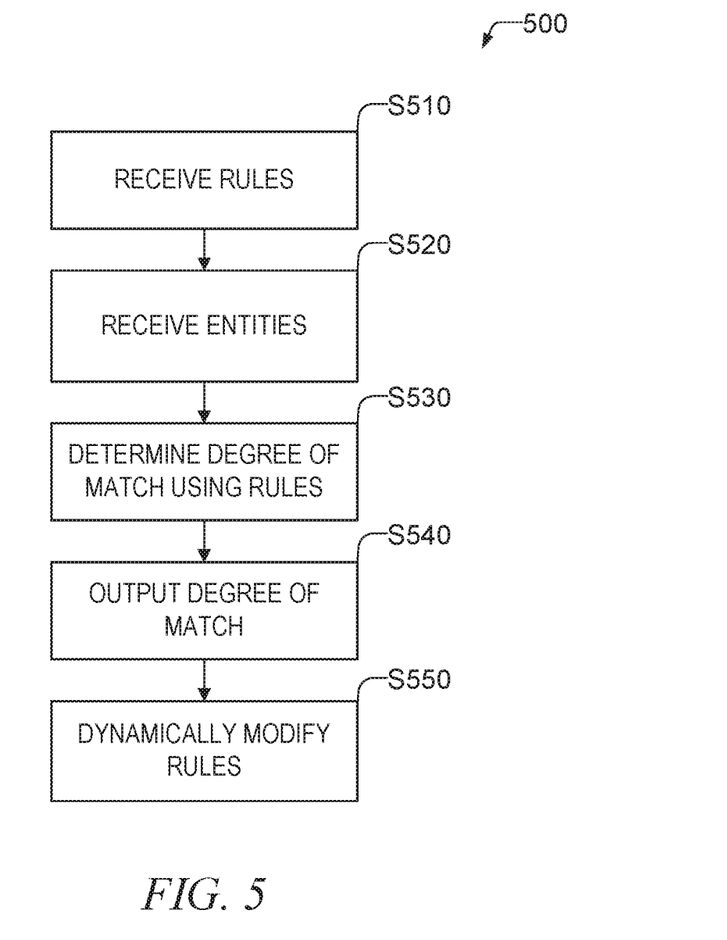
FIG. 5 is a high-level flowchart that illustrates an example of a process that may be used by the system.

FIG. 5 is a high level flowchart of the process 500 that may be used and is briefly described below. In operation S510, the initial rules that are to be used in the system may be defined and stored. These rules may be the rules 125 discussed above with respect to FIGS. 1A, 1B, that are stored in the matching metadata database 120, that have clauses (filters) which may be flexible and extensible, and that relate to entities, such as the events 115 that are received from the data source. In operation S520, entities, such as the events 115 described above, may be received by the system and compared against other stored entities to determine, in operation S530, a matching or a degree of matching based on the rules. The matching may be implemented as described above with respect to FIGS. 1A, 1B. To determine a match, the clauses of the rules may be scored, and then, based on an operation of the scored clauses, a determination can be made as to whether there is a match. In another implementation, an actual score value may be determined for the match itself, which represents a degree of the match. In operation S540, the match or the determined degree of matching may be provided as on output, such as on a user display device. In operation S550, the rules may be dynamically modified at run-time by optimizing the matching algorithms based on the content of data that is currently being ingested and the type and extent of the analysis being performed.

General Computer and Network Architecture

Figure 6:
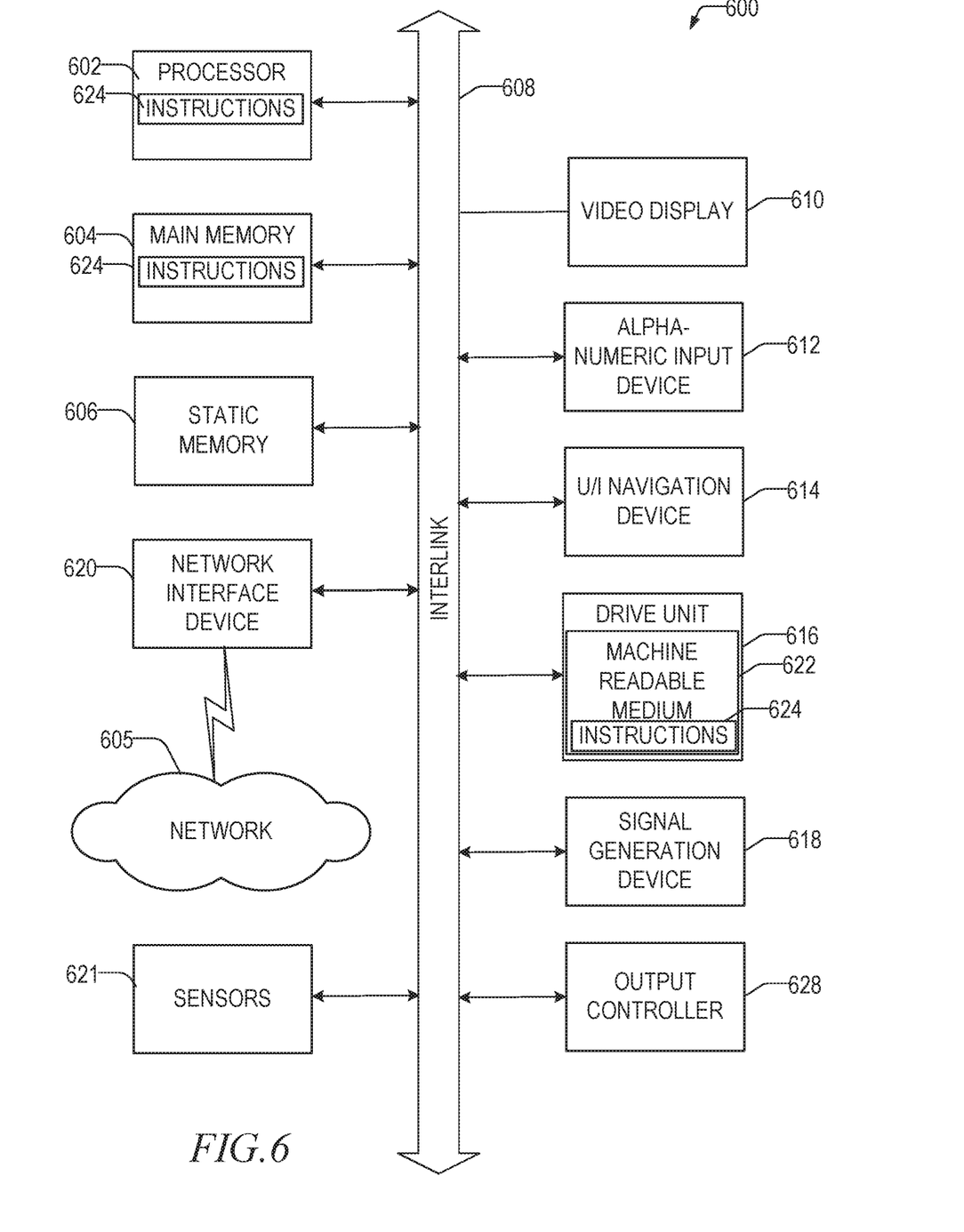
FIG. 6 is a block diagram illustrating a machine that may be a computer on which various processes described herein may be performed.

To describe some configurations in greater detail, reference is made to examples of hardware structures and interconnections usable in the designs of the present disclosure. FIG. 6 is a block diagram illustrating a machine that may be a computer on which various processes described herein may be performed. The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example described herein, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over the communications network 605 using a transmission medium via the network interface device 620. The term "transmission medium" is defined herein to include any medium that is capable of storing, encoding, or carrying instructions for execution by the machine, and includes digital or analog communications signals or other medium to facilitate communication of such software.

The machine 600 may communicate with one or more other machines 600 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 600. In an example, the network interface device 620 may include one or more physical jacks (e.g., Ethernet, coaxial, or phone jacks) or one or more antennas to connect to the communications network 626.

In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

A wide variety of computing devices may constitute a machine 600, as described herein. The following list includes a variety of devices that may fit the definition of a machine 600: a personal data assistant (PDA), a cellular telephone, including a smartphone, a tablet computing device, a laptop computer, a desktop computer, a workstation, a server computer, a mainframe computer, and the like.

Figure 7:
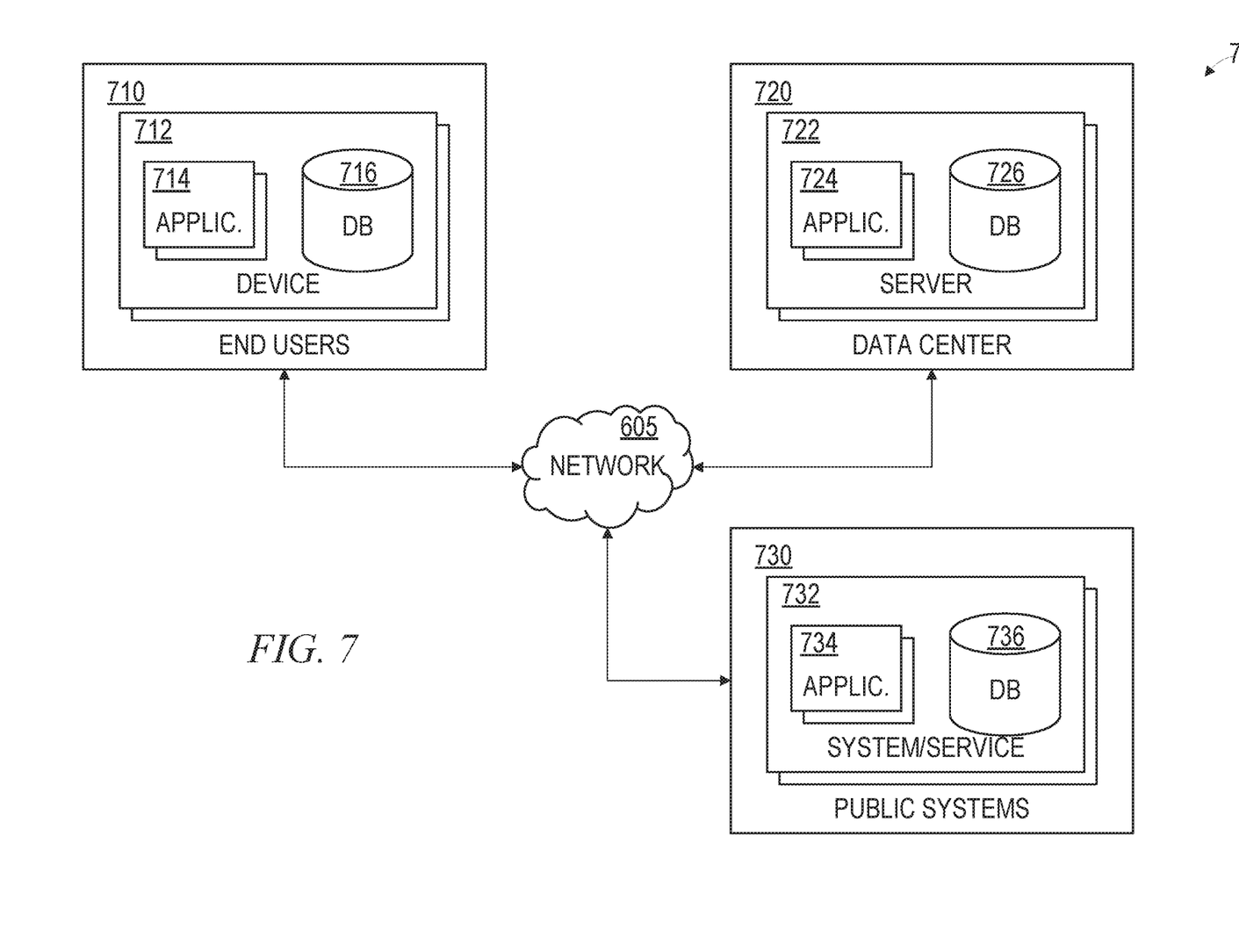
FIG. 7 is a block diagram of a distributed computing system.

FIG. 7 is a block diagram of a distributed system 700 that may include a client-server architecture or cloud computing system. The system 700 may be a system 100 as described above. Distributed system 700 may have one or more end users 710. An end user 710 may have various computing devices 712, which may be machines 600 as described above. The end-user computing devices 712 may comprise applications 714 that are either designed to execute in a stand-alone manner, or interact with other applications 714 located on the device 712 or accessible via the network 605. These devices 712 may also comprise a data store 716 that holds data locally, the data being potentially accessible by the local applications 714 or by remote applications.

The system 700 may also include one or more data centers 720. A data center 720 may be a server 722 or the like associated with a business entity that an end user 710 may interact with. The business entity may be a computer service provider, as may be the case for a cloud services provider, or it may be a consumer product or service provider, such as a retailer. The data center 720 may comprise one or more applications 724 and databases 726 that are designed to interface with the applications 714 and databases 716 of end-user devices 712. Data centers 720 may represent facilities in different geographic locations where the servers 722 may be located. Each of the servers 722 may be in the form of a machine(s) 600.

The system 700 may also include publicly available systems 730 that comprise various systems or services 732, including applications 734 and their respective databases 736. Such applications 734 may include news and other information feeds, search engines, social media applications, and the like. The systems or services 732 may be provided as comprising a machine(s) 600.

The end-user devices 712, data center servers 722, and public systems or services 732 may be configured to connect with each other via the network 605, and access to the network by machines may be made via a common connection point or different connection points, e.g. a wireless connection point and a wired connection. Any combination of common or different connections points may be present, and any combination of wired and wireless connection points may be present as well. The network 605, end users 710, data centers 720, and public systems 730 may include network hardware such as routers, switches, load balancers and/or other network devices.

Other implementations of the system 700 are also possible. For example, devices other than the client devices 712 and servers 722 shown may be included in the system 700. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 722.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products.

Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like. The code may also be intangibly stored on one or more non-transitory and non-volatile computer readable media, such as those described above. In these cases, instructions resident on the media are read and executed by a processor to perform various functions.

The above description is intended to be illustrative, and not restrictive. For example, the above-described examples (or one or more aspects/configurations thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it should not be used to interpret or limit the scope or meaning of the claims.

Also, in the above Detailed Description, various features may be grouped together to streamline the disclosure. However, the claims cannot set forth every feature disclosed herein, as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the claims, along with the full scope of equivalents to which such claims are entitled.

What is claimed is:

1. A computer-implemented method for dynamically modifying a rule-based matching system, comprising, using a processor:
    receiving a plurality of rules that are stored in a database in a storage device;
    receiving a plurality of entities as inputs;
    determining a degree of matching between a first entity and a second entity of the plurality of entities, using at least two of the plurality of rules, as a set of match rules, that contribute to the degree of matching, wherein the set of match rules is included in a query executed across a set of data nodes;
    outputting the determined degree of matching to a display device;
    dynamically modifying, at run-time, at least one of the set of match rules based on the degree of matching;
    adjusting the set of data nodes based on the at least one dynamically modified set of match rules; and
    updating one or more existing matches in the database affected by a respective rule of the at least one of dynamically modified set of match rules and the adjusted set of data nodes.

2. The method of claim 1, wherein the determining of the degree of matching comprises at least one operation selected from the group consisting of adding and multiplying individual non-zero rule scores for each of the at least two rules.

3. The method of claim 1, wherein the inputs comprise name-value pairs, and the receiving comprises parsing the name-value pairs.

4. The method of claim 1, further comprising scaling the processor by increasing or reducing processing power, in response to a condition selected from the group consisting of a varying number of entities received, and a varying complexity of the plurality of rules used in the determining of the degree of matching.

5. The method of claim 1, wherein the inputs are sourced from a combination of external databases, internal systems, and users of the system.

6. The method of claim 1, wherein each rule of the plurality of rules comprises a filter having a condition that must be met by the match in order for the rule to produce a non-zero rule score.

7. The method of claim 6, wherein each rule of the plurality of rules comprises a plurality of filters, each having a condition that must be met by the match in order for the rule to produce a non-zero rule score.

8. The method of claim 1, wherein each rule of the plurality of rules comprises a filter having an equation that adjusts a rule score.

9. The method of claim 1, wherein the plurality of rules implement fuzzy matching.

10. The method of claim 1, wherein at least two of the plurality of rules are executed in parallel for the determining.

11. The method of claim 1, wherein a rule score of a respective rule of the plurality of rules is inversely proportional to its degree of specificity.

12. The method of claim 1, further comprising:
    receiving a meta-rule that relate to the rules; and
    applying the meta-rule against the plurality of rules.

13. The method of claim 12, wherein the meta-rule is at least one of
    when a particular rule of the plurality of rules is deleted, matches that resulted from execution of the particular rule are retained in the database;
    when a new rule is added, not all existing matches in the database affected by the rule are updated.

14. The method of claim 1, wherein the dynamically modifying of the rule is based on an execution of a match that the rule was a part of.

15. A system comprising:
    a hardware processor;
    a storage device connected to the hardware processor comprising:
    a database comprising a plurality of rules;
    a database comprising a plurality of entities received at an input of the system; and
    a match database comprising a plurality of matches and respective match values between two entities of the plurality of entities determined by the processor using at least two rules of the plurality of rules, as a set of match rules, wherein the set of match rules is included in a query executed across a set of data nodes;
    wherein the set of data nodes is adjusted based on at least one dynamically modified set of match rules, and wherein at least one of the plurality of rules is dynamically modifiable at run-time and wherein one or more of the plurality of matches and match values are updated based on the at least one dynamically modifiable plurality of rules and the adjusted set of data nodes.

16. The system of claim 15, wherein the received entities comprise name-value pairs that are processed by the processor prior to entry into the database.

17. The system of claim 15, wherein each rule of the plurality of rules comprises a filter having a condition that must be met by the match in order for the rule to produce a non-zero rule score.

18. The system of claim 15, wherein the processor is further configured to execute the at least two rules in parallel.

19. A non-transitory computer-readable storage medium, the computer-readable storage medium including instructions that when executed by a processor, cause the processor to:
- receive a plurality of rules that are stored in a database in a storage device;
- receive a plurality of entities as inputs;
- determine a degree of matching between a first entity and a second entity of the plurality of entities, using at least two of the plurality of rules, as a set of match rules, that contribute to the degree of matching, wherein the set of match rules is included in a query executed across a set of data nodes;
- output the determined degree of matching to a display device;
- dynamically modify, at run-time, at least one of the set of match rules based on the degree of matching;
- adjust the set of data nodes based on the at least one dynamically modified set of match rules; and
- update one or more existing matches in the database affected by a respective rule of the at least one of dynamically modified set of match rules and the adjusted set of data nodes.

20. The storage medium of claim 19, wherein the instructions further cause the processor to scale the processor by increasing or reducing processing power both in response to a varying number of entities received and a varying complexity of the plurality of rules used to determine the degree of matching.

* * * * *

UNITED STATES PATENT AND TRADEMARK OFFICE
CERTIFICATE OF CORRECTION

PATENT NO. : 10,803,064 B1
APPLICATION NO. : 15/458252
DATED : October 13, 2020
INVENTOR(S) : Sanders et al.

Page 1 of 1

It is certified that error appears in the above-identified patent and that said Letters Patent is hereby corrected as shown below:

In the Claims

In Column 12, Line 30, in Claim 13, delete "of" and insert --of:-- therefor

Signed and Sealed this
Twelfth Day of January, 2021

Andrei Iancu
*Director of the United States Patent and Trademark Office*